(12) United States Patent
Drago et al.

(10) Patent No.: US 7,733,218 B2
(45) Date of Patent: Jun. 8, 2010

(54) RFID TAG RECEIVE SIGNAL STRENGTH INDICATOR

(75) Inventors: Randall Allen Drago, Gaithersburg, MD (US); Ming-Hao Sun, Gaithersburg, MD (US); Theodore Hockey, Mount Airy, MD (US); Joseph White, Woodbine, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 944 days.

(21) Appl. No.: 11/394,164

(22) Filed: Mar. 31, 2006

(65) Prior Publication Data

US 2007/0247286 A1 Oct. 25, 2007

(51) Int. Cl.
*H04Q 5/22* (2006.01)
*G08B 1/08* (2006.01)
*G08B 13/14* (2006.01)

(52) U.S. Cl. ............... 340/10.4; 340/10.51; 340/539.21; 340/10.33; 340/10.34; 340/572.3

(58) Field of Classification Search ................ 340/10.4, 340/10.1, 825.49, 7.21, 572.1, 572.4
See application file for complete search history.

(56) References Cited

U.S. PATENT DOCUMENTS 6,812,824 B1   11/2004  Goldinger et al.
2005/0134459 A1*  6/2005  Glick et al. ............... 340/572.1
2005/0225453 A1* 10/2005  Chang et al. ........... 340/825.69
2006/0022815 A1*  2/2006  Fischer et al. ................ 340/505
2006/0061474 A1*  3/2006  Shanks et al. ............. 340/572.1
2006/0064174 A1*  3/2006  Zadno ...................... 623/23.68
2006/0187046 A1*  8/2006  Kramer .................... 340/572.3
2006/0202828 A1*  9/2006  Shanks et al. ............. 340/572.1
2007/0090951 A1*  4/2007  Chan et al. ................ 340/572.1

FOREIGN PATENT DOCUMENTS

WO   WO2007/117828   10/2007

OTHER PUBLICATIONS

EPC Radio-Frequency Identity Protocols Class-1 Generation-2 UHF RFID Protocol for Communications at 860 MHz-960MHz, Version 1.0.9 by EPCglobal Copyright 2004.*
Search Report and Written Opinion for International Application No. PCT/US07/63803 mailed Nov. 16, 2007, 10 pages.

* cited by examiner

*Primary Examiner*—Daniel Wu
*Assistant Examiner*—Pameshanand Mahase
(74) *Attorney, Agent, or Firm*—Glenn Frankenberger; Bartholomew DiVita; Michael Giannetta

(57) ABSTRACT

Methods, systems, and apparatuses for detecting a reader signal strength in a radio frequency identification (RFID) tag is described. A tag is configured to monitor an attribute of a reader transmitted signal, such as the signal strength. The tag generates an indication of the signal attribute, and transmits the indication of the signal attribute to the reader.

24 Claims, 6 Drawing Sheets

RFID TAG RECEIVE SIGNAL STRENGTH INDICATOR

BACKGROUND OF THE INVENTION

1. Field of the Invention

The invention relates to radio frequency identification (RFID) technology, and in particular, to using RFID tags to monitor communication signals transmitted by RFID readers.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Because the reader "interrogates" RFID tags, and receives signals back from the tags in response to the interrogation, the reader is sometimes termed as "reader interrogator" or simply "interrogator."

With the maturation of RFID technology, efficient communication between tags and interrogators has become a key enabler in supply chain management, especially in manufacturing, shipping, and retail industries, as well as in building security installations, healthcare facilities, libraries, airports, warehouses etc.

In is important for reader signals to be received by tags. Various attributes of a communications environment may affect the ability of tags to receive reader signals. For example, obstacles in the environment may block, reflect, or attenuate reader signals. Reflection of signals may lead to "multi-path" issues, which can further lead to "RF nulls" in the environment.

Ideally, RFID readers transmit and receive RF energy in a straight line of sight with the RFID tags. However, in real implementations, this is rarely the case. Instead, the RF energy travels along multiple paths to the tag. These "multi-paths" are the product of the RF energy bouncing, reflecting, and/or being nulled by objects in the environment, including floors, walls, people, liquids, etc. The RFID environment can sometimes have "RF nulls" (e.g., dead zones) where the RF multi-paths substantially cancel, causing loss of the reader signal in the location of the null.

Thus, what is needed are ways to improve a quality of communications between readers and tags in an RFID communications environment to improve tag read rates.

BRIEF SUMMARY OF THE INVENTION

Methods, systems, and apparatuses for monitoring communication signals transmitted by radio frequency identification (RFID) readers are described. A tag is configured to monitor an attribute of a reader transmitted signal, such as the signal strength. The tag transmits an indication of the signal attribute to the reader. In this manner, the RFID communications environment can be monitored and improved, if desired.

In one aspect, a strength of the radio frequency communication signal can be measured directly by a tag. In another aspect, the strength of the radio frequency communication signal can be measured indirectly by the tag, such as by measuring an amplitude of an output signal of a charge pump in the tag. The charge pump stores radio frequency energy received on the radio frequency communication signal, and the stored energy is used to power the tag.

In an aspect of the present invention, RFID reader communication signals are monitored by an RFID tag. A command is received at the tag to measure a signal strength of a reader communication signal. The tag measures the strength of a received radio frequency communication signal. For example, the tag may measure an amplitude of a signal in the tag that is representative of an amount of a radio frequency energy received from the reader. The tag transmits an indication of the signal strength to the reader.

In a further aspect of the present invention, a radio frequency identification (RFID) tag includes an antenna and a signal strength monitor module. The signal strength monitor module is configured to measure a strength of a radio frequency communication signal received at the antenna. The signal strength monitor module is further configured to generate an indication of the measured strength of the radio frequency communication signal.

In an example aspect, the signal strength monitor module includes an analog-to-digital (A/D) converter configured to convert the received radio frequency communication signal, the output signal of the charge pump, or other signal representative of radio frequency energy received from the reader, from analog form to a digital representation.

In another example, the signal strength monitor module includes a plurality of comparators. Each comparator is configured to compare the radio frequency communication signal, the output signal of the charge pump, or other signal representative of radio frequency energy received from the reader, to a corresponding voltage. The plurality of comparators collectively outputs a digital representation of a received signal strength.

In another aspect of the present invention, a radio frequency identification (RFID) reader is configured to monitor transmitted signal strength. The reader transmits a command to a tag to measure a signal strength of a reader communication signal. The reader communication signal is transmitted. An indication of the strength of the transmitted radio frequency communication signal is received from the tag.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
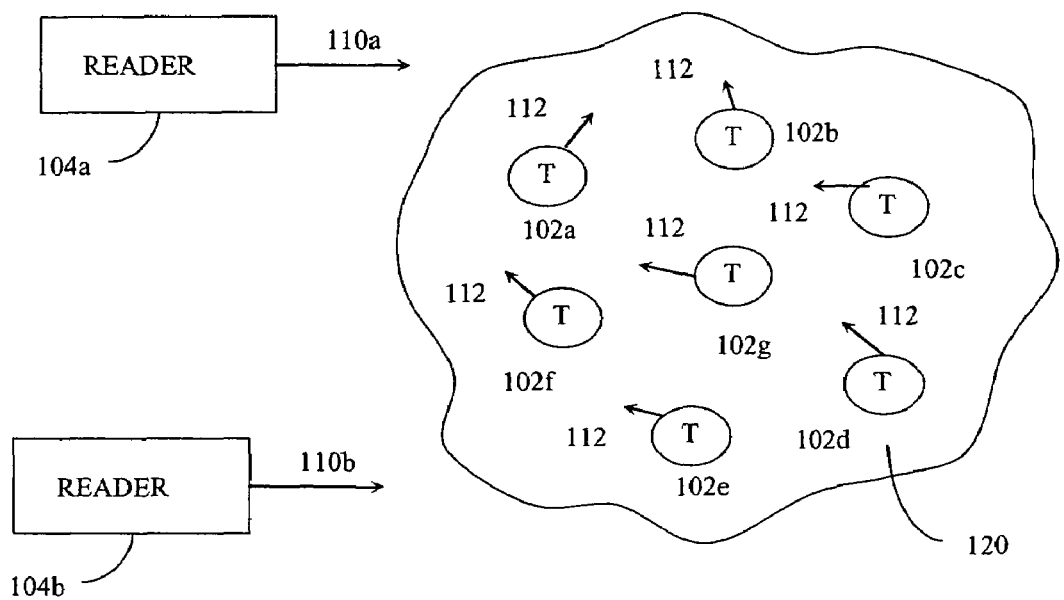
FIG. 1 shows an environment where RFID readers communicate with an exemplary population of RFID tags.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

Methods, systems, and apparatuses for RFID devices are described herein. In particular, methods, systems, and apparatuses for monitoring reader transmitted signals are described.

RFID tags are used to monitor a strength of signals transmitted by RFID readers. In one embodiment, a reader transmits a command to a tag to instruct the tag to measure a received signal strength. The tag responds to the reader command with an indication of the received signal strength, such as an indication of an amount of energy received at the tag from the reader on a reader transmitted radio frequency signal.

Embodiments of the present invention aid in overcoming problems with multi-path issues and RF nulls, and allow a reader to ascertain an effective communication range. After using a tag to determine a reader transmitted signal strength, the environment can be adapted to improve communications, if desired. For example, to improve the environment, the reader and/or tag may be repositioned until a location is found providing acceptable signal strength. Furthermore, other objects in the environment may be repositioned, if needed, to improve signal strength, and reduce multi-path issues.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System Embodiment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110 having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
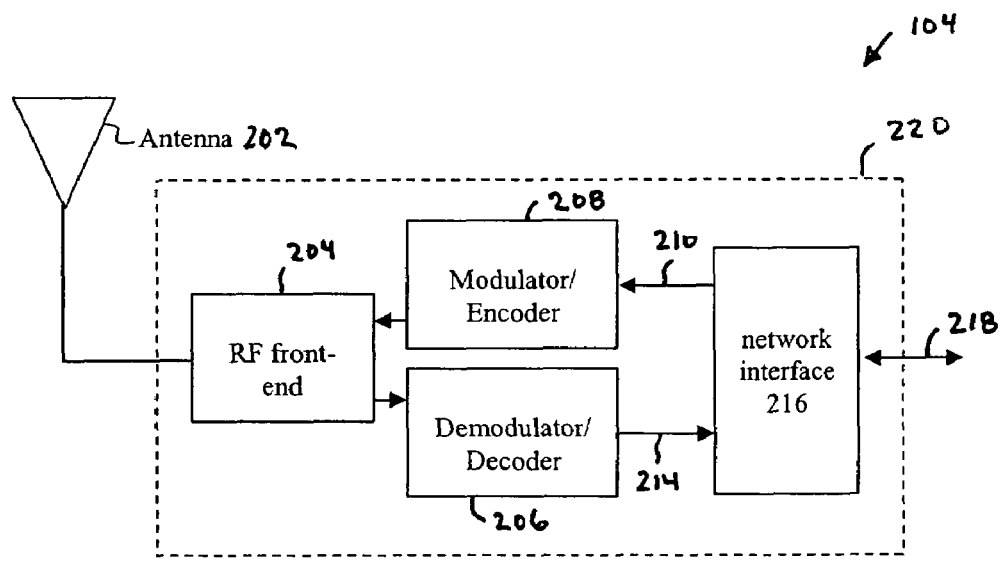
FIG. 2 shows a block diagram of receiver and transmitter portions of an RFID reader.

FIG. 2 shows a block diagram of a receiver and transmitter portion 220 of an example RFID reader 104. Reader 104 includes one or more antennas 202, a RF front-end 204, a demodulator/decoder 206, a modulator/encoder 208, and a network interface 216. These components of reader 104 may include software, hardware, and/or firmware, or any combination thereof, for performing their functions.

Reader 104 has at least one antenna 202 for communicating with tags 102 and/or other readers 104. RF front-end 204 may include one or more antenna matching elements, amplifiers, filters, an echo-cancellation unit, a down-converter, and/or an up-converter. RF front-end 204 receives a tag response signal through antenna 202 and down-converts (if necessary) the response signal to a frequency range amenable to further signal processing. Furthermore, RF front-end 204 receives a modulated encoded interrogation signal from modulator/encoder 208, up-converts (if necessary) the interrogation signal, and transmits the interrogation signal to antenna 202 to be radiated.

Antenna(s) 202 may be any type of reader antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Demodulator/decoder 206 is coupled to an output of RF front-end 204, receiving a modulated tag response signal from RF front-end 204. Demodulator/decoder 206 demodulates the tag response signal. For example, the tag response signal may include backscattered data encoded according to FM0 or Miller encoding formats in an EPC Gen 2 embodiment. Demodulator/decoder 206 outputs a decoded data signal 214. Decoded data signal 214 may be further processed in reader 104. Additionally or alternatively, decoded data signal 214 may be transmitted to a subsequent computer system for further processing.

Modulator/encoder 208 is coupled to an input of RF front-end 204, and receives an interrogation request 210. Modulator/encoder 208 encodes interrogation request 210 into a signal format, such as one of FM0 or Miller encoding formats, modulates the encoded signal, and outputs the modulated encoded interrogation signal to RF front-end 204.

In an embodiment, reader 104 includes network interface 216 to interface reader 104 with a communications network 218. When present, network interface 216 is used to provide interrogation request 210 to reader 104, which may be received from a remote server coupled to communications network 218. Furthermore, network interface 216 is used to transmit decoded data signal 214 from reader 104 to a remote server coupled to communications network 218. In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In further embodiments, alternative mechanisms for initiating an interrogation request may be present in reader 104. For example, reader 104 may include a finger-trigger mechanism, a keyboard, a graphical user interface (GUI), and/or a voice activated mechanism with which a user of reader 104 may interact to initiate an interrogation by reader 104.

Figure 3:
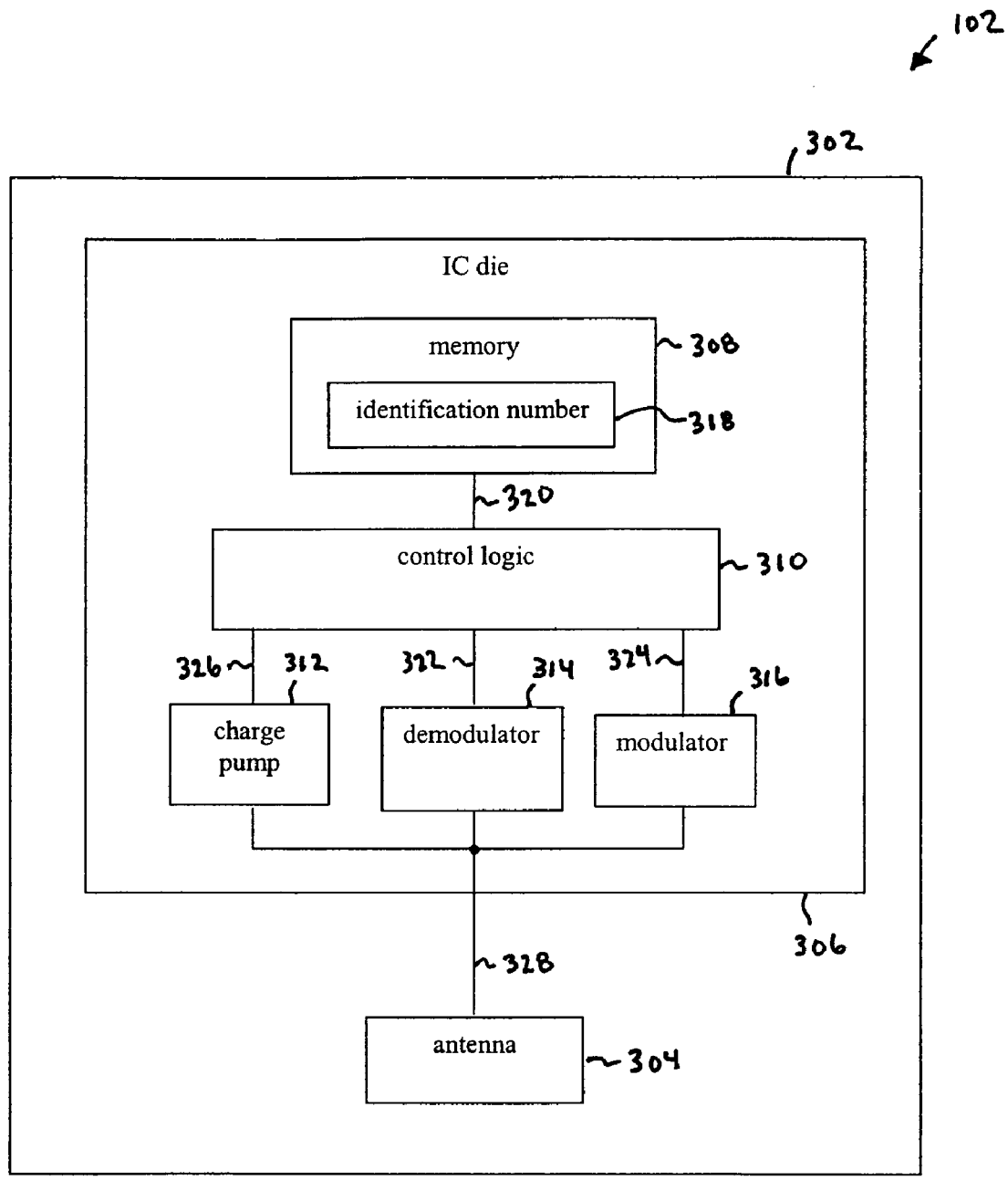
FIG. 3 shows a plan view of an example radio frequency identification (RFID) tag.

The present invention is applicable to any type of RFID tag. FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328. Note that in the present disclosure, the terms "lead" and "signal" may be used interchangeably to denote the connection between elements or the signal flowing on that connection.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320.

In an embodiment, charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags.

As further described below, according to embodiments of the present invention, a tag is used to monitor a strength of a signal transmitted by a reader. Embodiments of the present invention are described in further detail below. Such embodiments may be implemented in the environments, readers, and tags described above, and/or in alternative environments and alternative RFID devices. Furthermore, the embodiments described herein may be adapted for the monitoring of further communication signal attributes in addition or alternatively to signal strength, as would be apparent to persons skilled in the relevant art(s).

Example Signal Monitor Embodiments

Embodiments are described herein for using tags to monitor reader transmitted signals. These embodiments can be implemented anywhere that readers and tags are used. For example, embodiments can be implemented in a commercial or industrial environment, such as in a warehouse, a factory, a business, or store, and in a military or other non-commercial environment.

Figure 4:
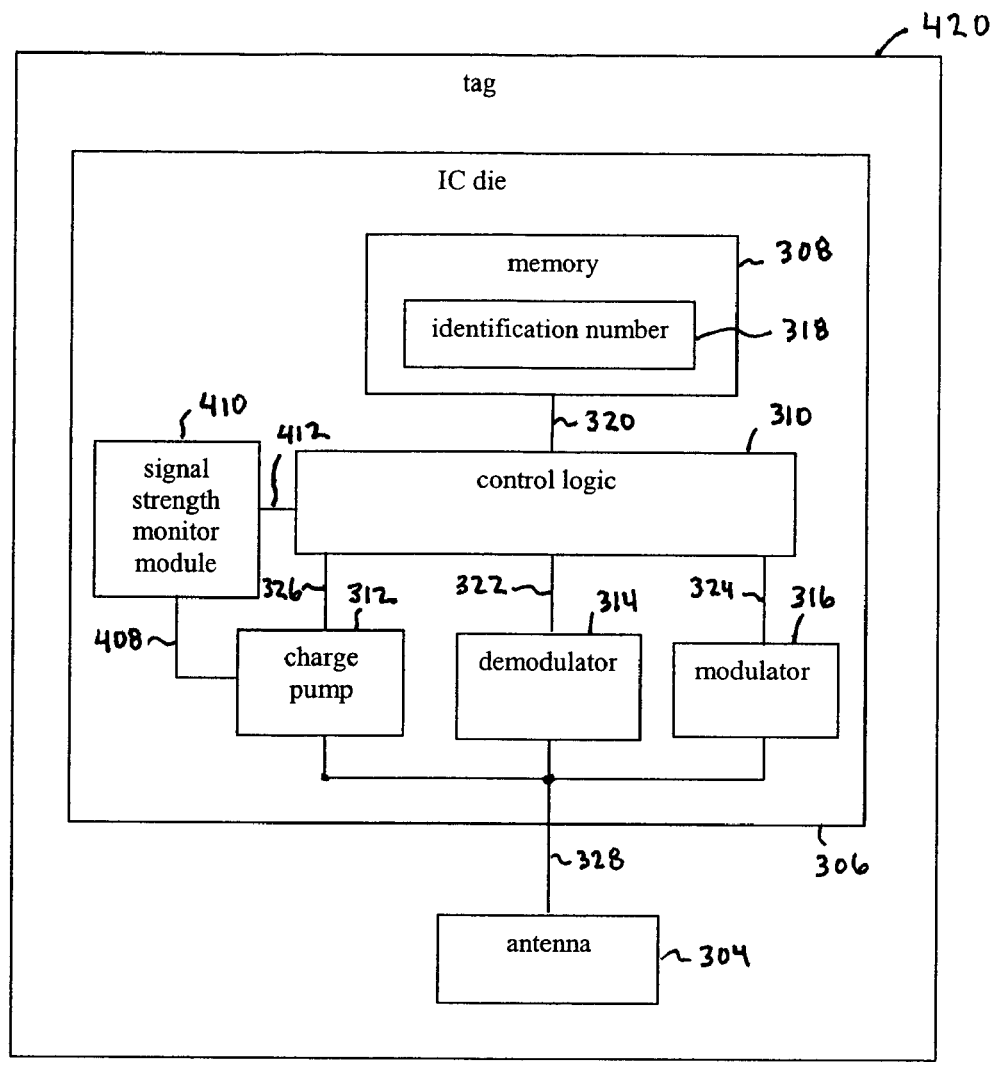
FIG. 4 shows a system for monitoring a reader transmitted signal, according to an example embodiment of the present invention.
Figure 4:
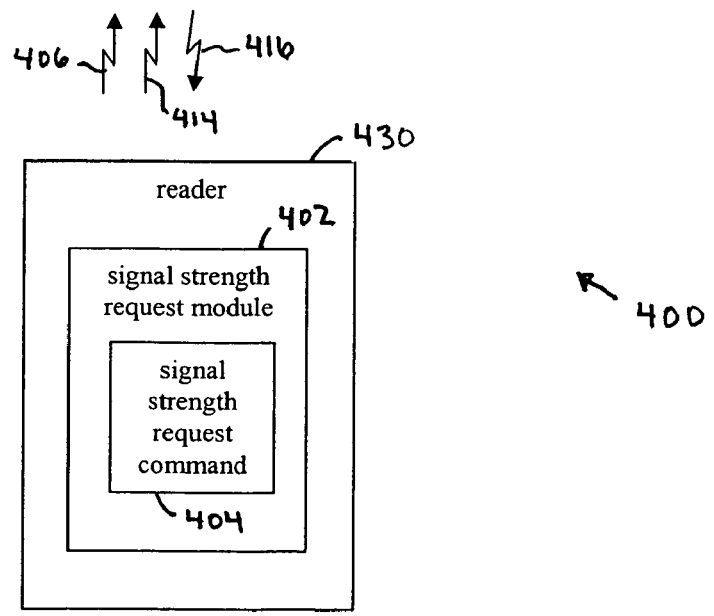

FIG. 4 shows a RFID communications system 400, with reader signal monitoring capability, according to an embodiment of the present invention. As shown in FIG. 4, system 400 includes a tag 420 and a reader 430. In an embodiment, reader 430 communicates with tag 420 to request a signal strength indication from tag 420. Tag 420 provides the signal strength indication to reader 430. Further example description of tag 420 and reader 430, and an operational description of system 400, is provided in the following subsections.

Example Reader Embodiments

Reader 430 may be configured similarly to any type of RFID reader, including the embodiments of reader 104 shown in FIGS. 1 and 2, and further described above. Reader 430 further includes a signal strength request module 402. Signal strength request module 402 includes a signal strength request command 404. Signal strength request module 402 is shown internal to reader 430 in FIG. 4, but may alternatively be external to reader 430 (e.g., located in a remote computer system that communicates with reader 430).

Signal strength request module 402 is configured to communicate (e.g., using the receiver/transmitter functionality of reader 104, such as described above) with a tag, such as tag 420, to request that the tag provide an indication to reader 430 of a strength of a signal transmitted by reader 430. Signal strength request module 402 may include any hardware, software, firmware, or any combination thereof, needed to perform its functions.

Figure 5A:
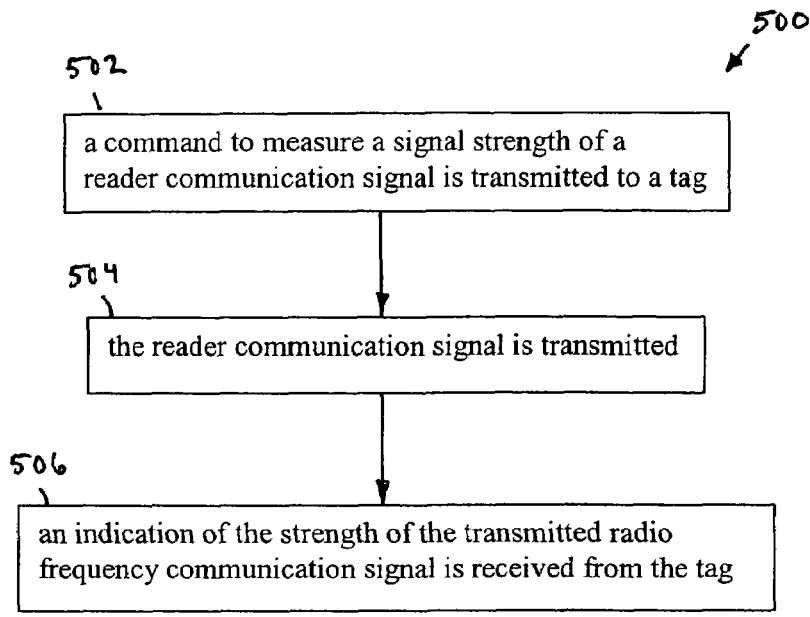
FIG. 5A shows a flowchart for a reader to communicate with a tag to monitor a reader transmitted signal, according to an example embodiment of the present invention.

FIG. 5A shows a flowchart 500 providing example steps for reader 430 to communicate with a tag according to signal strength request module 402. Other structural and operational embodiments will be apparent to persons skilled in the relevant art(s) based on the following discussion. As described below, the steps shown in FIG. 5 do not necessarily have to occur in the order shown, and in an embodiment, steps 502 and 504 may overlap.

Flowchart 500 begins with step 502. In step 502, a command to measure a signal strength of a reader communication signal is transmitted to a tag. For example, the command is signal strength request command 404 shown in FIG. 4, which may be stored in signal strength request module 402. Signal strength request command 404 may be configured in any manner, and in accordance with any RFID communications protocol mentioned elsewhere herein, or otherwise known by persons skilled in the relevant art(s). For example, signal strength request command 404 may be formatted in accordance with the EPC Gen 2 RFID protocol. In such an embodiment, signal strength request command 404 may be a CUSTOM command. Furthermore, signal strength request command 404 may be configured to be directed to a single tag, or to a group of tags, even including all tags in communications range of reader 430.

In an embodiment, signal strength request command 404 may include one or more parameters. For example, verify command 404 may include a timing parameter. The timing parameter may be used in the targeted tag to dictate a time (e.g., measured from receipt of command 404) at which the tag should perform a measurement of signal strength. Alternatively, signal strength request command 404 does not include a parameter, and merely instructs one or more tags to respond with a signal strength indication.

Signal strength request command 404 is transmitted in signal strength request signal 406, shown in FIG. 4. The generation and transmission of signal strength request signal 406 may be initiated by a user of reader 430 (e.g., by a button or trigger), a mechanism internal to reader 430, by an external computer system that communicates with reader 430, or by other mechanism.

In step 504, the reader communication signal is transmitted. For example, the reader communication signal is reader communication signal 414 shown in FIG. 4. Thus, in an embodiment, tag 420 performs a signal strength measurement of reader communication signal 414, which is a separate signal from the signal strength request signal 406, previously sent. Alternatively, in an embodiment, it is not required to transmit a separate reader communication signal for measurement by tag 420. For example, tag 420 may be performing signal strength measurements on a continuous basis, and when signal strength request command 404 is received, tag 420 merely responds with its most recent signal strength measurement. In another embodiment, tag 420 performs a signal strength measurement on signal strength request signal 406, which includes signal strength request command 404. Thus, in such an embodiment, steps 502 and 504 may be overlapping, referring to the same transmitted signal.

In step 506, an indication of the strength of the transmitted radio frequency communication signal is received from the tag. For example, the received signal is signal strength response signal 416, which is received from tag 420 in FIG. 4. Thus, reader 430 receives an indication of the strength of a signal transmitted by reader 430 (e.g., signal strength request signal 406 or reader communication signal 414), and reader 430 and/or a user of reader 430 can act accordingly.

Example Tag Embodiments

As shown in FIG. 4, tag 420 is configured similar to the embodiment of FIG. 3, and further includes a signal strength monitor module 410. Signal strength monitor module 410 receives charge pump output signal 408, and outputs a signal strength indication 412. Signal strength monitor module 410 is configured to monitor a strength of communications signals received from readers. Signal strength monitor module 410 may monitor received signals on a periodic basis, or upon occurrence of an event, such as receipt of signal strength request command 404 from reader 430. Signal strength monitor module 410 generates a signal strength indication to be transmitted to reader 430. Signal strength monitor module 410 may include any hardware, software, firmware, or any combination thereof, needed to perform its functions.

In an embodiment, such as shown in FIG. 4, signal strength monitor module 410 may be coupled indirectly to antenna 304, such as through charge pump 312, and thus may receive a radio frequency communication signal indirectly from antenna 304. In an alternative embodiment, signal strength monitor module 410 may be directly coupled to antenna signal 328 of antenna 304, and thus may receive a radio frequency communication signal directly from antenna 304.

Figure 5B:
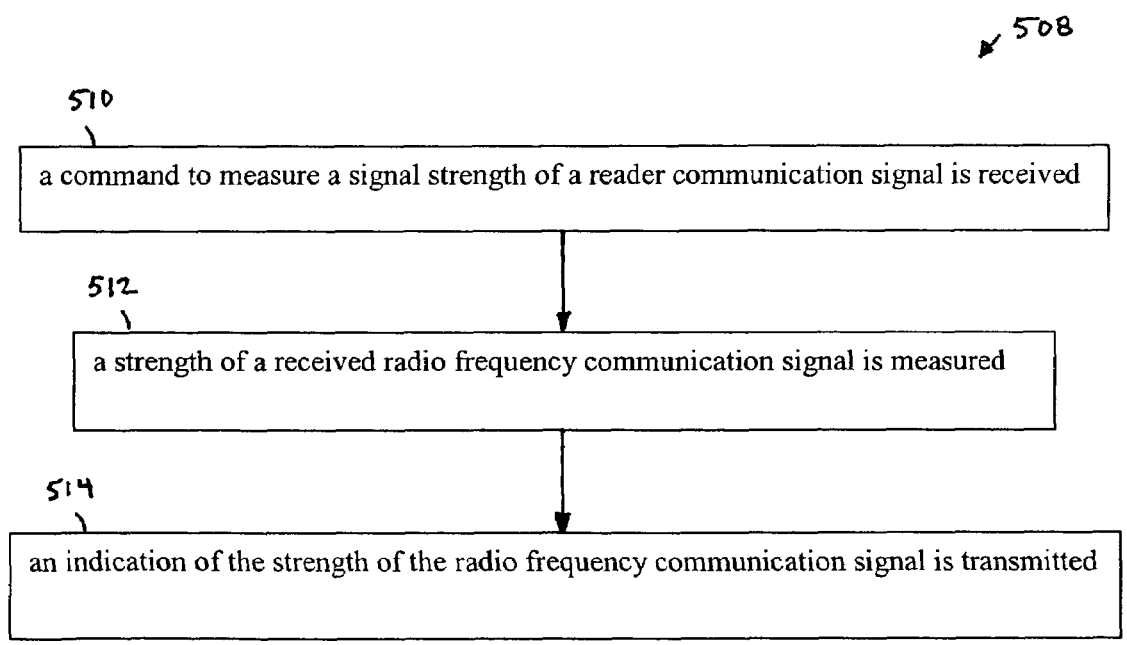
FIG. 5B shows a flowchart for a tag to monitor a reader transmitted signal, according to an example embodiment of the present invention.

FIG. 5B shows a flowchart 508 providing example steps in a tag for providing a signal strength indication to a reader. Other structural and operational embodiments will be apparent to persons skilled in the relevant art(s) based on the following discussion.

Flowchart 508 begins with step 510. In step 510, a command to measure a signal strength of a reader communication signal is received. For example, antenna 304 of tag 420 receives signal strength request command 404 from reader 430 in signal strength request signal 406. For example, demodulator 314 and control logic 310 may be used to recover signal strength request command 404 from signal strength request signal 406. Tag 420 may communicate according to any communications protocol mentioned herein or otherwise known.

In step 512, a strength of a received radio frequency communication signal is measured. For example, in an embodiment, receipt of signal strength request command 404 causes signal strength monitor module 410 to measure a strength of a received radio frequency communication signal (e.g., signal strength request signal 406 or reader communication signal 414). As described above, in an embodiment, signal strength request command 404 may be continuously measuring strengths of received reader signals. Thus, step 512 may occur before, during, or after step 510, depending on the particular implementation. In an embodiment, a measured signal strength may be stored in memory 308.

Furthermore, when signal strength request command 404 includes a timing parameter, signal strength monitor module 410 may include a timing module to process the timing parameter, to determine a time when a signal strength measurement should be executed. Signal strength monitor module 410 may include further modules, as needed, to process further parameters of a signal strength request command 404.

Signal strength monitor module 410 can be configured to measure signal strengths in a variety of ways, several examples of which are illustrated in detail further below.

In step 514 of FIG. 5B, an indication of the strength of the radio frequency communication signal is transmitted. For example tag 420 may transmit signal strength response signal 416, including the signal strength indication.

Tag Signal Strength Monitor Embodiments

Example embodiments for performing step 512 with signal strength monitor module 410 are described as follows. These examples are provided for illustrative purposes, and are not limiting. The examples described herein may be adapted to any type of tag. Further structural and operational embodiments, including modifications/alterations, will become apparent to persons skilled in the relevant art(s) from the teachings herein.

As shown in FIG. 4, in an embodiment, signal strength monitor 410 may be coupled indirectly to an input radio frequency signal, such as through charge pump 312. Alternatively, signal strength monitor module 410 may be coupled directly to an input radio frequency signal via antenna signal 328. As described above, charge pump 312 has various functions. Reader 430 typically transmits a radio frequency signal (e.g., including a carrier frequency, modulated or not modulated) to communicate with tags, and to provide energy to the tags. The tags recover and store the energy using charge pump 312. The stored energy is used to power the tags.

As shown in FIG. 4, charge pump 312 receives an input radio frequency communication signal (e.g., a carrier signal transmitted by reader 430) via antenna signal 328 from antenna 304. Charge pump 312 rectifies the input radio frequency communication signal, and stores the energy of the input radio frequency communication signal to create a direct current (DC) voltage that is output on tag power signal 326. The level of the DC voltage is increased by charge pump 312 until an operational threshold voltage level is reached that is high enough to power the electrical circuits of IC die 306. Typically, tag power signal 326 is coupled to a regulator, to maintain a particular desired voltage level for powering IC die 306.

Figure 6:
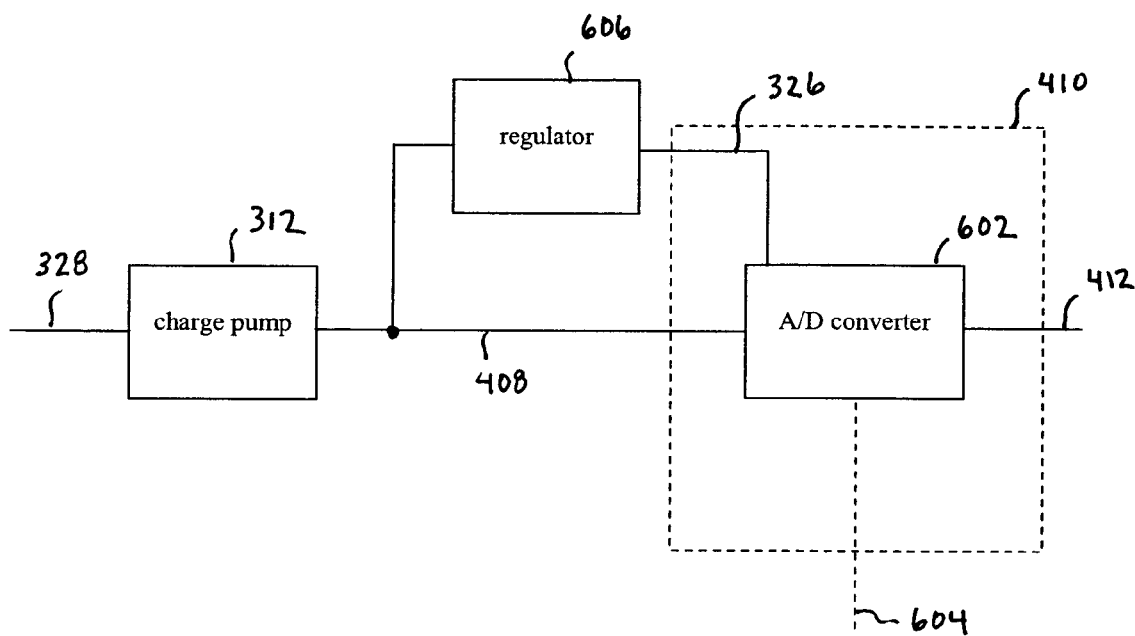
FIGS. 6 and 7A show example signal strength monitor modules, according to embodiments of the present invention.

For example, FIG. 6 shows a regulator 606 coupled to charge pump output signal 408. Regulator 606 regulates and outputs tag power signal 326 at a desired voltage level, such as 1 V. (In the embodiment of FIG. 4, a regulator, such as regulator 606, may be internal to charge pump 312). The voltage level of charge pump output signal 408, however is not limited to 1 V. After reaching the operational threshold voltage, charge pump 312 is configured to continue to store energy from the input radio frequency communication signal, raising the voltage level of charge pump output signal 408 further, until a maximum voltage is reached. If the maximum voltage is reached, a shunt regulator circuit prevents the voltage of charge pump output signal 408 from increasing any further.

At any time, the actual DC voltage level reached on charge pump output signal 408 will vary based on the amount of energy that is reaching tag 420 from reader 430. The amount of energy reaching tag 420 on the input radio frequency signal depends on several factors, including a power level at which the reader transmits the signal, the position of tag 420 with respect to any RF nulls, and a distance between reader 430 and tag 420. The closer tag 420 is to reader 430, the more energy will be received to be converted by charge pump 312 into the DC voltage level of charge pump output signal 408.

For example, in an embodiment, an operational threshold DC level to power IC die 306 may be 1 V. Thus, if charge pump 312 outputs less than 1 V on charge pump output signal 408, tag power signal 326 will be less than 1 V, and tag 420 will not be capable of responding to reader interrogations. Once the 1 V threshold level is reached on charge pump output signal 408, and thus also on tag power signal 326, IC die 306 will be operational, and tag 420 will be capable of responding to reader interrogations. In an example, 5 V may be maximum voltage level for charge pump output signal 408. Thus, in the current example, a range of voltages of 1 V to 5 V are possible on charge pump output signal 408, depending on the amount of energy being received and stored from the input radio frequency communications signal. Thus, in embodiments, signal strength monitor module 410 measures a value of charge pump output signal 408 in the range of operational voltages (e.g., 1-5 V) for tag 420, to provide an indication of a received signal strength from reader 430.

In the current example, when reader 430 transmits a signal strength request command 404 to tag 420, either tag 420 will not respond because charge pump output signal 408 is less than 1 V, and thus tag 420 is not operational, or signal strength monitor module 410 will measure a voltage value for charge pump output signal 408 between 1 V and 5 V. Tag 420 will respond with an indication of this value to reader 430, as an indication of received signal strength.

Signal strength monitor module 410 outputs signal strength indication 412. Signal strength indication 412 may be in analog or digital form. Signal strength indication 412 is received by control logic 310. Control logic 310 formats (e.g., encodes, compresses, etc.) signal strength indication 412, if needed, stores signal strength indication 412 in memory 308 (optionally), and outputs signal strength indication 412 to modulator 316 to be transmitted from tag 420 (via antenna 304). Signal strength monitor module 410 may be configured in various ways to measure a received signal strength, as would be understood by persons skilled in the relevant art(s) from the teachings herein.

FIG. 6 shows an example block diagram of signal strength monitor module 410, according to an embodiment of the present invention. As shown in FIG. 6, signal strength monitor module 410 includes an analog to digital (A/D) converter 602. A/D converter 602 receives power on tag power signal 326 from regulator 606. A/D converter 602 receives charge pump output signal 408 from charge pump 312.

A/D converter 602 converts a voltage level of charge pump output signal 408 into digital form, to provide an indication of a signal strength of the radio frequency signal received by antenna 304. Alternatively, A/D converter 602 may receive the input radio frequency communication signal directly from antenna 304, or a rectified (i.e., not level increased) version of the input radio frequency communication signal from charge pump 312, to generate various other indications of received signal strengths.

As shown in FIG. 6, A/D converter 602 may receive an enable signal 604. Enable signal 604 is optional. When present, enable signal 604 may be used to enable A/D converter 602 to convert charge pump output signal 408 into digital form. For example, enable signal 604 may be generated by control logic 310. In a normal mode, A/D converter 602 may be held non-operational by enable signal 604 (e.g., to save power). When signal strength request command 404 is received, control logic 310 may pulse enable signal 604 to enable A/D converter 602 to operate on charge pump output signal 408, to generate a signal strength indication.

Figure 7A:
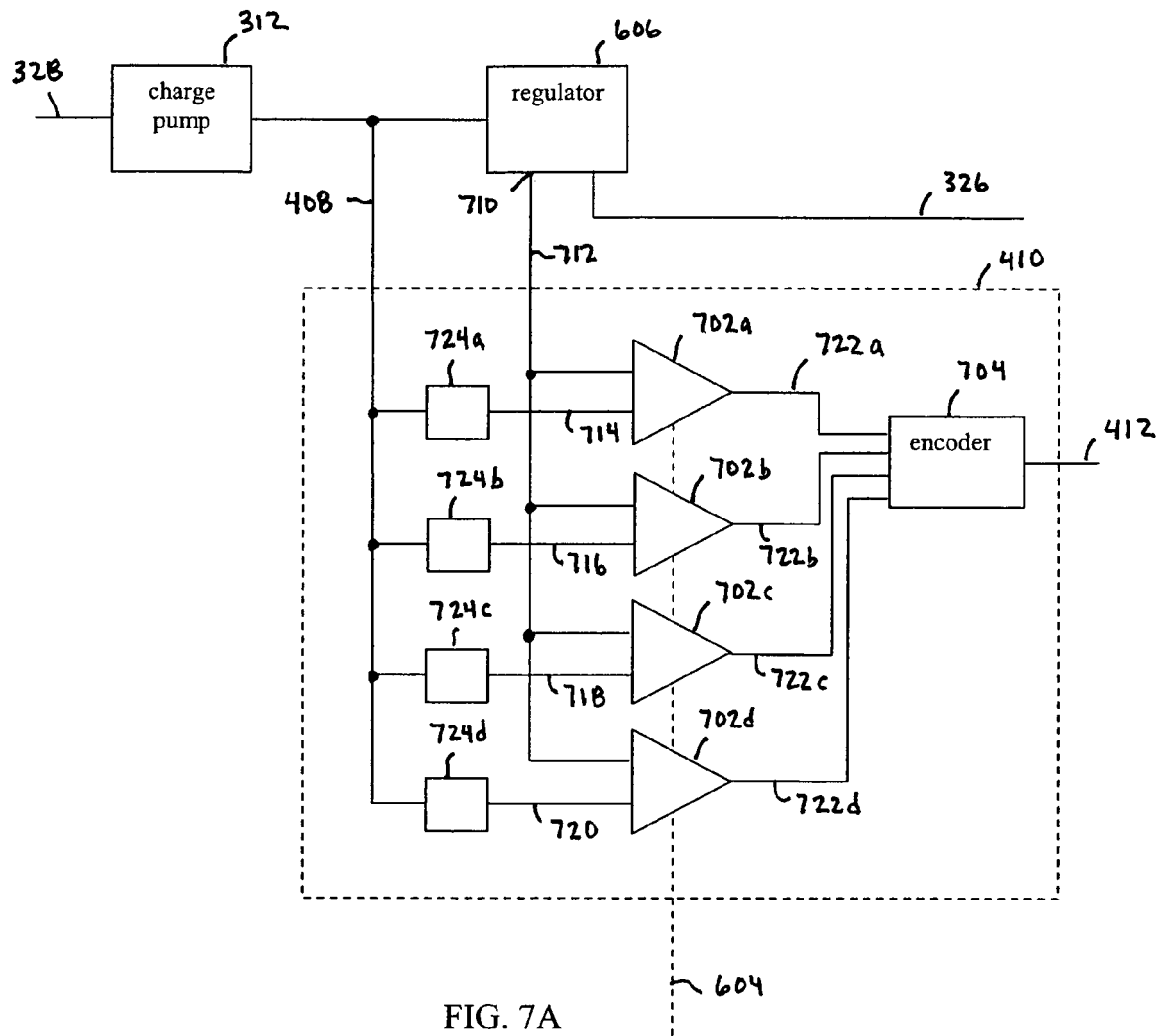

FIG. 7A shows another example block diagram of signal strength monitor module 410, according to another embodiment of the present invention. As shown in FIG. 7A, signal strength monitor module 410 includes four comparators 702a-702d, an encoder 704, and four voltage scalers 724a-724d. Four comparators 702a-702 are shown in FIG. 7A for illustrative purposes. In other embodiments, any number of comparators 702 may be present, including 16, 32, 64, 128, 256, and further numbers of comparators, depending on the amount of resolution desired.

As shown in FIG. 7A, regulator 606 receives charge pump output signal 408 from charge pump 312 and generates tag power signal 326. Regulator 606 further has a reference output 710. Reference output 710 outputs a substantially steady reference voltage signal 712, such as 0.6 V, when sufficient energy is received by tag 420 to make tag 420 operational.

Signal strength monitor module 410 receives reference voltage signal 712 and charge pump output signal 408. In the embodiment of FIG. 7A, signal strength monitor module 410 generates various scaled versions of charge pump output signal 408 that are compared against reference voltage signal 712 to determine a rough voltage level of charge pump output signal 408. The determined voltage level is an indication of received signal strength that may be transmitted to the reader.

Each comparator 702 of comparators 702a-702d receives reference voltage signal 712 at a first input. Charge pump output signal 408 is received by each of voltage scalers 724a-724d. In the example of FIG. 7A, voltage scalers 724a-724d respectively output a first scaled voltage signal 714, a second scaled voltage signal 716, a third scaled voltage signal 718, and a fourth scaled voltage signal 720, which are successively lower voltage values generated from charge pump output signal 408. The successively reduced values of first through fourth scaled voltage signals 714, 716, 718, and 720 are compared with reference voltage signal 712, to roughly determine a voltage level of charge pump output signal 408.

Figure 7B:
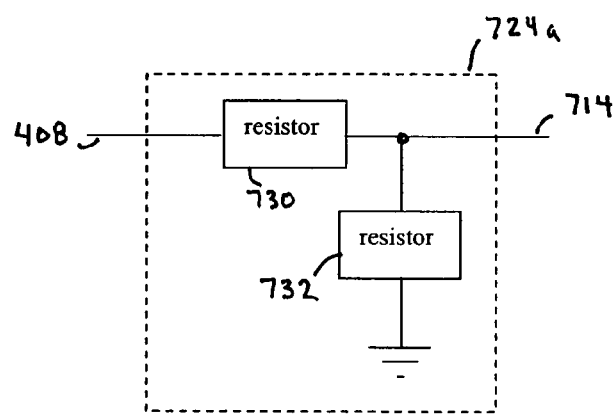
FIG. 7B shows an example voltage scaler circuit.

For example, each voltage scaler 724 may includes diodes, resistors, other circuit elements, or software/firmware, to generate the corresponding scaled voltage signal. FIG. 7B shows an example of voltage scaler 724a. As shown in FIG. 7B, voltage scaler 724a includes a first resistor 730 and a second resistor 732. First and second resistors 730 and 732 are configured in a resistor divider configuration, to generate first scaled voltage signal 714 from charge pump output signal 408 according to a scale factor, as follows:

$$\text{Signal 714} = \text{Scale factor} \times \text{Charge pump output signal 408}$$

$$\text{Signal 714} = \frac{\text{Resistor 732}}{\text{Resistor 730} + \text{Resistor 732}} \times \text{Charge pump output signal 408}$$

where:

$$\text{Scale factor} = \frac{\text{Resistor 732}}{\text{Resistor 730} + \text{Resistor 732}}$$

Other types of voltage scalers than shown in FIG. 7B may alternatively be used.

Voltage scalers 724b-724d may be configured similarly to the configuration for voltage scaler 724a shown in FIG. 7B. In an example implementation, charge pump output signal may be equal to 3.6 V. First voltage scaler 724a may be configured to have a scale factor of 0.2, and thus first scaled voltage signal 714=3.6 V×0.2 V=0.72 V. Second voltage scaler 724b may be configured to have a scale factor of 0.15, and thus second scaled voltage signal 716=3.6 V×0.15 V=0.54 V. Third voltage scaler 724c may be configured to have a scale factor of 0.1, and thus third scaled voltage signal 718=3.6 V×0.1 V=0.36 V. Fourth voltage scaler 724d may be configured to have a scale factor of 0.05, and thus fourth scaled voltage signal 720=3.6 V×0.05 V=0.18 V.

Comparators 702a-702d each compare reference voltage signal 712 against a respective one of first through fourth reference voltage signals 714, 716, 718, and 720, to determine a rough voltage value for charge pump output signal 408. First comparator 702a receives first reference voltage signal 714 at a second input. Second comparator 702b receives second reference voltage signal 716 at a second input. Third comparator 702c receives third reference voltage signal 718 at a second input. Fourth comparator 702d receives fourth reference voltage signal 720 at a second input. Comparators 702a-702d each compare their first input (reference voltage signal 712) to their second input (one of reference voltage signals 714, 716, 718, 720), to generate a corresponding one of four compare output signals 722a-722d. In this manner, a rough voltage value of tag power signal 326 is determined.

For instance, in the current example, if the value of reference voltage signal 712 is 0.6 V, and a comparator 702 outputs a "1" if the first input is greater than the second input and outputs of "0" if the first input is less than the second input, the values of compare output signals 722a-722d are:

First compare output signal 722a=1
Second compare output signal 722b=0
Third compare output signal 722c=0
Fourth compare output signal 722d=0

Encoder 704 is optionally present. When present, encoder 704 receives compare output signals 722a-722b, and outputs an encoded version of signal strength indication 412. For example, encoder 704 may be used to encode compare output signals 722a-722d into fewer bits, e.g., from 4 bits to 2 bits. For instance, the following values for compare output signals 722a-722d may be encoded by encoder 704 as follows:

| Output Signals 722a-722d | Encoded value (indication 412) |
|---|---|
| 1000 | 00 |
| 1100 | 01 |
| 1110 | 10 |
| 1111 | 11 |

Encoder 704 may encode output signals 722a-722d in other ways than shown above for the current example.

When numbers of compare output signals 722 other than four are present, encoder 704 can encode them in a corresponding fashion. For example, if 64 compare output signals 722 are present, encoder 704 may encode them into six bits (or into other numbers of bits). If 256 compare output signals 722 are present, encoder 704 may encode them into eight bits (or into other numbers of bits). Signal strength indication 412 may be a single signal line providing the encoded bits in a serial stream, or may be a bus providing the encoded bits in parallel.

Various numbers of output signals 722 can be present to provide corresponding levels of resolution for a signal strength measurement. For example, four comparators 702 can be present to output four output signals 722 (as shown in FIG. 4) to provide a relatively low signal strength resolution. In contrast, 256 comparators 702 can be present to output 256 output signals 722 to provide a relatively higher signal strength resolution, which may be desirable in particular applications.

Signal strength monitor module 410 may be configured in further ways to provide an indication of received signal strength. For instance, in a similar fashion to the configuration of FIG. 7, signal strength monitor module 410 may generate various scaled versions of reference voltage signal 712 that each are compared against charge pump output signal 408 to determine a rough voltage level of charge pump output signal 408.

Example Computer System Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system (e.g., a reader) using a removable storage drive, hard drive, or communications interface. The control logic (software), when executed by a processor, causes the processor to perform the functions of the invention as described herein.

According to an example embodiment, a reader may execute computer-readable instructions to command a tag to provide a signal strength indication. Furthermore, in an embodiment, a tag may execute computer-readable instructions to monitor a signal strength of a reader transmitted signal, as further described elsewhere herein.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for monitoring a radio frequency identification (RFID) reader communication signal in a RFID tag, comprising:
   (a) receiving at the tag a command having a timing parameter to measure a signal strength of a reader communication signal, wherein the timing parameter dictates a time for measuring the signal strength;
   (b) measuring a strength of a received radio frequency communication signal from an output signal of a charge pump in the tag; and
   (c) transmitting an indication of the strength of the radio frequency communication signal.

2. The method of claim 1, wherein the command is transmitted by a reader according to an EPC Gen 2 communications protocol, wherein the command is a CUSTOM command, wherein step (a) comprises: receiving at the tag the CUSTOM command.

3. The method of claim 1, wherein step (b) comprises: converting the received radio frequency communication signal from analog form to a digital representation.

4. The method of claim 3, wherein step (c) comprises: transmitting the digital representation.

5. The method of claim 1, wherein step (b) comprises:
   receiving the radio frequency communication signal;
   converting the received radio frequency communication signal to a direct current (DC) voltage signal;
   comparing the DC voltage signal to a plurality of different reference DC voltages to generate an indication of a strength of the received radio frequency communication signal.

6. The method of claim 5, wherein step (b) further comprises: encoding the generated indication.

7. The method of claim 6, wherein step (c) comprises: transmitting the encoded indication.

8. The method of claim 1, wherein step (b) comprises:
   receiving the radio frequency communication signal;
   converting the received radio frequency communication signal to a direct current (DC) voltage signal;
   generating a plurality of sealed versions of the DC voltage signal; and comparing the plurality of scaled versions of the DC voltage signal to a reference DC voltage to generate a indication of a strength of the received radio frequency communication signal.

9. The method of claim 1, wherein step (b) comprises:
receiving the radio frequency communication signal;
converting the received radio frequency communication signal to a direct current voltage signal; and
generating the indication of the strength of the received radio frequency communication signal by measuring an amplitude of the direct current voltage signal.

10. A system for monitoring a radio frequency identification (RFID) reader communication signal in a RFID tag, comprising:
means for receiving at the tag a command, having a timing parameter, to measure a signal strength of a reader communication signal, wherein the timing parameter dictates a time for measuring the signal strength;
means for measuring a strength of a received radio frequency communication signal from an output signal of a charge pump in the tag; and
means for transmitting an indication of the strength of the radio frequency communication signal.

11. A radio frequency identification (RFID) tag, comprising:
an antenna to receive a command, having a timing parameter, to measure a strength of a radio frequency communication signal, wherein the timing parameter dictates a time for measuring the signal strength; and
a signal strength monitor module configured to measure the strength of the radio frequency communication signal received by the antenna from an output signal of a charge pump in the tag; wherein the signal strength monitor module is further configured to generate an indication of the measured strength of the radio frequency communication signal.

12. The RFID tag of claim 11, further comprising: a modulator coupled to the antenna; wherein the modulator is configured to modulate the indication of the strength of the radio frequency communication signal onto a radio frequency signal.

13. The RFID tag of claim 11, further comprising: a demodulator coupled to the antenna; wherein the demodulator is configured to demodulate a radio frequency signal received by the antenna to recover a command to measure the signal strength of a reader communication signal.

14. The RFID tag of claim 13, wherein the command is received according to an EPC Gen 2 communications protocol, wherein the command is a CUSTOM command.

15. The RFID tag of claim 11, further comprising:
a substrate; and
an integrated circuit (IC) die mounted to the substrate, wherein the signal strength monitor module is in the IC die; wherein the antenna is formed on the substrate.

16. The RFID tag of claim 11, further comprising: a charge pump that generates a direct current (DC) voltage signal from the received radio frequency communications signal.

17. The RFID tag of claim 16, wherein the signal strength monitor module comprises: an analog-to-digital (A/D) converter configured to convert the DC voltage signal from analog form to a digital representation.

18. The RFID tag of claim 17, further comprising: a modulator coupled to the antenna, wherein the modulator is configured to modulate a radio frequency signal with the digital representation.

19. The RFID tag of claim 16, wherein the signal strength monitor module comprises: a plurality of comparators, wherein each comparator of the plurality of comparators is configured to compare a corresponding scaled version of the DC voltage signal to a reference voltage, wherein the plurality of comparators collectively output a digital representation of an amplitude of the DC voltage.

20. The RFID tag of claim 19, wherein the signal strength monitor module further comprises: an encoder configured to encode the digital representation.

21. The RFID tag of claim 20, further comprising: a modulator coupled to the antenna, wherein the modulator is configured to modulate a radio frequency signal with the encoded digital representation.

22. A method in a radio frequency identification (RFID) reader for monitoring transmitted signal strength, comprising:
(a) transmitting to a tag a command, having a timing parameter, to measure a signal strength of a reader communication signal, wherein the timing parameter dictates a time for measuring the signal strength;
(b) transmitting the reader communication signal; and
(c) receiving from the tag an indication of the strength of the transmitted radio frequency communication signal from an output signal of a charge pump in the tag.

23. The method of claim 22, wherein the command is a CUSTOM command of the EPC Gen 2 communications protocol, wherein step (a) comprises: transmitting the CUSTOM command.

24. A system in a radio frequency identification (RFID) reader communication for monitoring transmitted signal strength, comprising:
means for transmitting to a tag a command, having a timing parameter, to measure a signal strength of a reader communication signal, wherein the timing parameter dictates a time for measuring the signal strength; and
means for receiving from the tag an indication of the strength of a transmitted radio frequency communication signal from an output signal of a charge pump in the tag.

* * * * *

UNITED STATES PATENT AND TRADEMARK OFFICE
CERTIFICATE OF CORRECTION

| | |
|---|---|
| PATENT NO. | : 7,733,218 B2 |
| APPLICATION NO. | : 11/394164 |
| DATED | : June 8, 2010 |
| INVENTOR(S) | : Drago et al. |

Page 1 of 1

It is certified that error appears in the above-identified patent and that said Letters Patent is hereby corrected as shown below:

In Column 13, Line 3, delete "greater and than" and insert -- greater than --, therefor.

In Column 13, Line 4, delete "of" and insert -- a --, therefor.

In Column 14, Line 66, in Claim 8, delete "sealed" and insert -- scaled --, therefor.

Signed and Sealed this
Seventh Day of August, 2012

David J. Kappos
*Director of the United States Patent and Trademark Office*